C. MOORE.
SPECTACLES.
APPLICATION FILED JUNE 1, 1918.
1,289,227.
Patented Dec. 31, 1918.
Fig. 1.
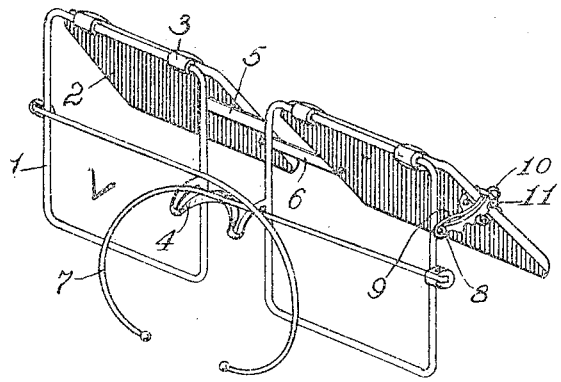
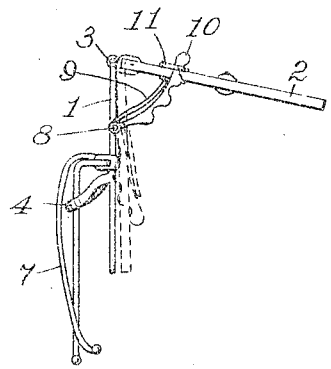
Fig. 2.
INVENTOR.
Claude Moore,
BY G.C. Kennedy,
ATTORNEY.

UNITED STATES PATENT OFFICE.

CLAUDE MOORE, OF CEDAR RAPIDS, IOWA.

SPECTACLES.

1,289,227.

Specification of Letters Patent. Patented Dec. 31, 1918.

Application filed June 1, 1918. Serial No. 237,748.

*To all whom it may concern:*

Be it known that I, CLAUDE MOORE, a citizen of the United States of America, and a resident of Cedar Rapids, Linn county, Iowa, have invented certain new and useful Improvements in Spectacles, of which the following is a specification.

My invention relates to improvements in spectacles, and the object of my improvement is to supply for the use of chauffeurs and others spectacles having colored glasses hinged to open frames and provided with adjustable means for holding them in desired inclined positions relative to said frames, or secured in a closed position relative thereto.

This object I have accomplished by the means which are hereinafter described and claimed, and which are illustrated in the accompanying drawings, in which Figure 1 is a perspective view of a pair of my improved spectacles, showing the hinged glasses raised to an adjusted inclined position relative to their open frames, and Fig. 2 is an end elevation of the same, the full lines indicating the raised position of said glasses, and the dotted lines the lowered position of the same.

Similar numerals of reference denote corresponding parts throughout the several views.

My improved spectacles have rectangular open frames 1 rigidly connected in the usual spaced relation by means of a nose-piece 4 and a cross-bar 5. Bows 7 are in the usual manner hinged at the middles of the outer upright bars of said frames to swing toward each other. The numeral 2 denotes a pair of colored, tinted or smoked glasses of rectangular form of dimensions suitable to cause them to cover the openings of the frames 1 when lowered, and are hinged to the top bars of said frames at 3.

I have supplied the following means for holding said glasses at an adjusted angle relative to said frames. The glasses are rigidly connected by a cross-bar 6 so as to move together without deflection. On one of the outer side bars of one frame 1 is a fixed pintle 8 upon which is pivotally mounted one end of a curved rack-bar 10. At an opposite location on the adjacent glass 2 is fixed a loop 11 through which the free end of said rack-bar extends movably.

The detents of said rack-bar detachably engage the lower member of said loop, and are kept in engagement therewith yieldingly by means of a small bar-spring 9, one end of which is secured to said pintle 8, and its other end bearing resiliently upon the top of said rack-bar. The positions of the pivotal connection of the rack-bar and said loop may be reversed to be mounted respectively upon said glass and said frame, without departing from my invention.

The rock-bar may be manually lifted to clear its detents in adjusting the angle of inclination of said glasses relative to said frames, and then the said spring will hold it in engagement with the loop when released, as also when in its lowered position, as indicated by the dotted lines in Fig. 2.

The glasses are rectangular to increase the field of vision therethrough, and are colored, tinted or smoked to dim the glare of the sun when setting or rising, or of an approaching head-light or lights on a vehicle. In use, the glasses are usually raised to about the angle shown in said figures, so that the user may look under them at close objects, while having his or her eyes protected from a glaring light ahead, the light being seen through the glasses. The inclination of the glasses may be adjusted by the means shown as necessary relative to a glaring light ahead, or entirely closed down.

Other equivalent means for holding the glasses in a certain position relative to the frames may be used and still be covered by the principle of my invention.

Having described my invention, what I claim as new, and desire to secure by Letters Patent, is:

1. The combination with a pair of open spectacle-frames, of colored glasses hinged to their top bars to swing upwardly therefrom, and means for supporting said glasses at an angle relative to said frames, comprising a rack pivoted to one of said frames, engaging-means on the adjacent glass with which said rack detachably engages, and yieldable resilient means yieldingly holding said rack in engagement with said engaging-means.

2. The combination with a pair of open rectangular spectacle-frames, of rectangular colored glasses hinged thereto, and means for supporting said glasses at an adjusted position relative to said frames, comprising a rack pivoted to one of the frames, means on the adjacent glass for engaging said rack detachably, and a spring bearing yieldingly upon said rack to retain it in an adjusted position of engagement with the said engaging-means.

3. The combination with a pair of open spectacle-frames, of glasses hinged thereto, and means for supporting said glasses at desired positions relative to said frames, comprising an arm pivoted on one of the frames and having engaging-means, a loop fixed on the adjacent glass, the arm being passed movably through said loop, its engaging-means adapted to engage a part thereof detachably, and yieldable resilient means for yieldingly holding said arm in engagement with said loop.

In testimony whereof I affix my signature.

CLAUDE MOORE.